United States Patent
Forster

(10) Patent No.: US 9,092,709 B2
(45) Date of Patent: Jul. 28, 2015

(54) RFID TAG INCLUDING ENVIRONMENTALLY SENSITIVE MATERIALS

(75) Inventor: Ian J. Forster, Essex (GB)

(73) Assignee: Avery Dennison Corporation, Glendale, CA (US)

( * ) Notice: Subject to any disclaimer, the term of this patent is extended or adjusted under 35 U.S.C. 154(b) by 526 days.

(21) Appl. No.: 12/862,847

(22) Filed: Aug. 25, 2010

(65) Prior Publication Data

US 2012/0050011 A1  Mar. 1, 2012

(51) Int. Cl.

| | |
|---|---|
| H04Q 5/22 | (2006.01) |
| G08B 13/14 | (2006.01) |
| H01Q 9/00 | (2006.01) |
| H01Q 13/10 | (2006.01) |
| G06K 19/07 | (2006.01) |
| G06K 19/073 | (2006.01) |
| H01Q 1/22 | (2006.01) |
| H01Q 13/16 | (2006.01) |

(52) U.S. Cl.
CPC ........ *G06K 19/0716* (2013.01); *G06K 19/0739* (2013.01); *H01Q 1/2216* (2013.01); *H01Q 13/103* (2013.01); *H01Q 13/16* (2013.01)

(58) Field of Classification Search
USPC ................. 235/375–385, 439, 441, 451, 492; 343/700
See application file for complete search history.

(56) References Cited

U.S. PATENT DOCUMENTS

| | | | |
|---|---|---|---|
| 6,320,509 B1 * | 11/2001 | Brady et al. ............... | 340/572.7 |
| 7,159,774 B2 | 1/2007 | Woodard et al. | |
| 7,298,343 B2 | 11/2007 | Forster et al. | |
| 7,397,378 B1 * | 7/2008 | Leason ...................... | 340/572.7 |
| 7,489,246 B2 | 2/2009 | Himberger et al. | |
| 2003/0112192 A1 | 6/2003 | King et al. | |
| 2003/0122721 A1 | 7/2003 | Sievenpiper | |
| 2004/0178958 A1 * | 9/2004 | Kadambi et al. ........ | 343/700 MS |
| 2005/0200539 A1 * | 9/2005 | Forster et al. ................. | 343/749 |
| 2005/0248488 A1 * | 11/2005 | Modro ................... | 343/700 MS |
| 2006/0091225 A1 * | 5/2006 | Forster et al. ................. | 235/492 |
| 2006/0244606 A1 * | 11/2006 | Li et al. ..................... | 340/572.7 |
| 2007/0080233 A1 * | 4/2007 | Forster et al. ................. | 235/492 |
| 2009/0108996 A1 * | 4/2009 | Day ............................ | 340/10.1 |
| 2009/0219158 A1 * | 9/2009 | Nikitin et al. .............. | 340/572.7 |
| 2009/0261953 A1 | 10/2009 | Kang et al. | |
| 2010/0007569 A1 * | 1/2010 | Sim et al. ..................... | 343/795 |
| 2010/0072287 A1 * | 3/2010 | Kai et al. ...................... | 235/492 |
| 2010/0123582 A1 * | 5/2010 | Smith et al. ................ | 340/572.3 |

FOREIGN PATENT DOCUMENTS

| | | |
|---|---|---|
| DE | 102009005100 | 7/2010 |
| EP | 2182581 | 5/2010 |

OTHER PUBLICATIONS

International Search Report and Written Opinion dated May 11, 2012 for International Application No. PCT/US2011/057556.

* cited by examiner

*Primary Examiner* — George Bugg
*Assistant Examiner* — Renee Dorsey
(74) *Attorney, Agent, or Firm* — Avery Dennison Retail Information Services LLC

(57) ABSTRACT

According to one exemplary embodiment, an RFID device is disclosed. The RFID device includes a substrate, an antenna structure having a first sheet of electrically conductive material including two parts and an elongated slot extending therebetween, a wireless communications device coupled to the substrate, and an environmentally-responsive material disposed within a portion of the elongated slot.

19 Claims, 1 Drawing Sheet

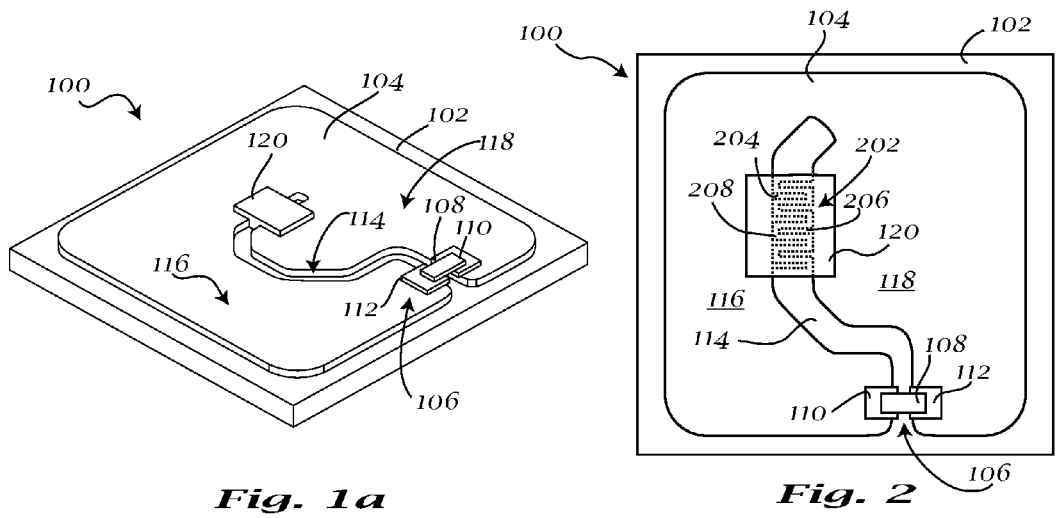
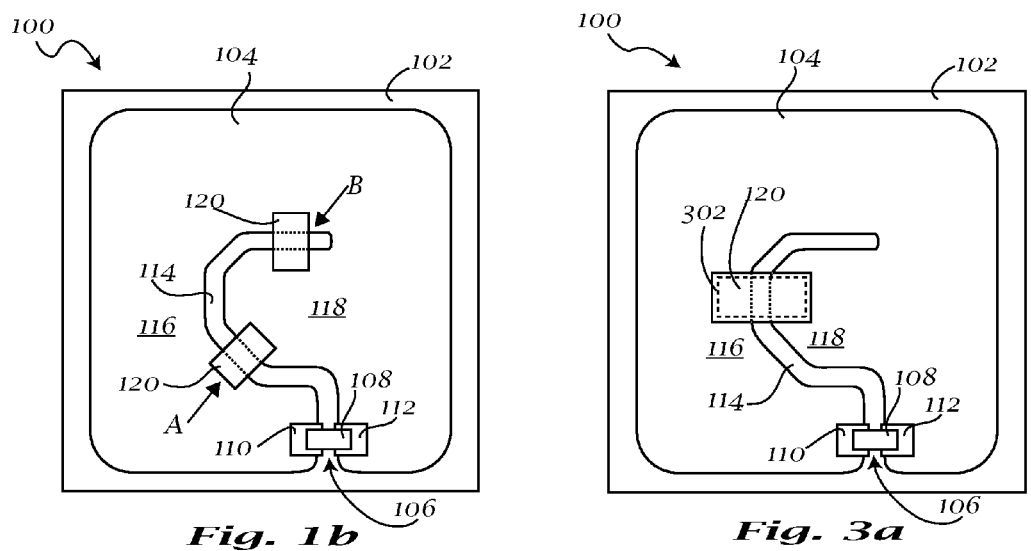
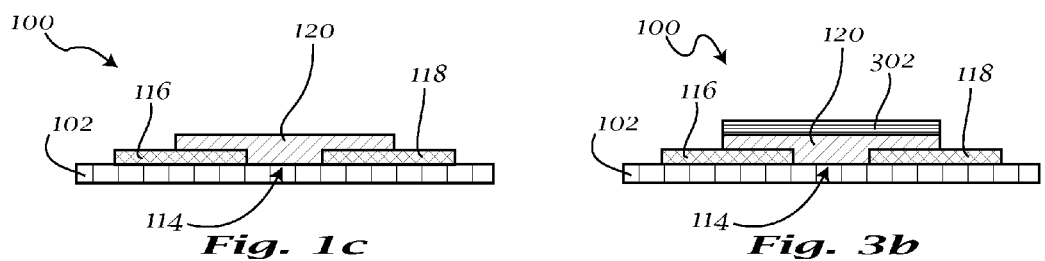

RFID TAG INCLUDING ENVIRONMENTALLY SENSITIVE MATERIALS

FIELD OF THE INVENTION

The field of the invention relates to the use of environmentally sensitive materials and conductive antennas for radio frequency identification based sensing applications and constructions related thereto.

BACKGROUND OF THE INVENTION

The use of radio frequency identification (RFID) to identify one of a plurality of items is well known. Typical RFID tags or integrated circuits include a microprocessor, also known as a microchip, electrically connected to an antenna. Alternatively, the microchip is first attached to a pad having electrical leads that provides a larger attachment of "landing" area. This is typically referred to as a "strap" or "interposer." The strap is then attached to the antenna.

The microprocessor stores data, which can include identifying data unique to a specific item, which is transmitted to an external receiver for reading by an operator and processing of the item. RFID tags can be attached to items for inventory control, shipment control, and the like. RFID tags are particularly useful in identifying, tracking and controlling items such as packages, pallets, and other product containers. The location of each item can be tracked and information identifying the owner of the item or specific handling requirements, can be encoded into the RFID and later read by a scanning device capable of decoding and displaying the information.

Accordingly, RFID tags can be attached to items entering or within a supply chain and the identifying information received can be processed for various reasons in a variety of manners. RFID tags are particularly useful in identifying, tracking and controlling items such as pallets, packages and individual product containers. In many instances, it is desirable to monitor and obtain information regarding the environmental conditions to which the items are exposed. For example, certain items may be sensitive to fluctuations in temperature, humidity, pressure, or other physical parameters, and certain items may be sensitive to the presence or absence of chemical or biological materials. As with many products contained in individual containers within supply chains, obtaining environmental conditions information at the item-level is beneficial within supply chains where the quality, safety, lifespan, or other characteristics of the items may be affected by environmental conditions.

SUMMARY OF THE INVENTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

According to one exemplary embodiment, an RFID device is disclosed. The RFID device can include a substrate, an antenna structure having a first sheet of electrically conductive material including two parts and an elongated slot extending therebetween, a wireless communications device coupled to the substrate, and an environmentally-responsive material disposed within a portion of the elongated slot.

According to another exemplary embodiment, an antenna structure is disclosed. The antenna structure can include a sheet of electrically conductive material having a first part and a second part, and the first and second parts may be coupled together reactively, conductively or through a combination of both reactive and conductive coupling such that an operating parameter of the antenna structure varies in relation to an environmental condition.

In another exemplary embodiment, an RFID device is described. The RFID device can include a substrate, an antenna structure having a sheet of electrically conductive material having a first part and a second part, the two parts being capacitively coupled together such that an operating parameter of the antenna structure varies in relation to an environmental condition and a wireless communications device coupled to the antenna structure.

Yet another exemplary embodiment can describe a method of forming an RFID device. The method of forming an RFID device can include steps for depositing a first electrically conductive material on a substrate; defining an elongated slot in the first electrically conductive material; depositing an environmentally responsive material at a location along the elongated slot; and coupling a wireless communications device to the antenna structure.

Another exemplary embodiment describes a method of detecting an environmental condition, which can include wirelessly communicating with an RFID device having an antenna structure and varying an operating parameter of the antenna structure in relation to the environmental condition.

Other features and advantages of the present invention will become apparent to those skilled in the art from the following detailed description. It is to be understood, however, that the detailed description of the various embodiments and specific examples, while indicating preferred and other embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

These, as well as other objects and advantages of this invention, will be more completely understood and appreciated by referring to the following more detailed description of the presently preferred exemplary embodiments of the invention in conjunction with the accompanying drawings, of which:

FIG. 1a is an oblique view of an exemplary embodiment of an RFID device;

FIG. 1b is a plan view of an exemplary embodiment of an RFID device;

FIG. 1c is a cutaway view of an exemplary embodiment of an RFID device;

FIG. 2 is a plan view of another exemplary embodiment of an RFID device;

FIG. 3a is a plan view of another exemplary embodiment of an RFID device; and

FIG. 3b is a cutaway view of another exemplary embodiment of an RFID device.

DETAILED DESCRIPTION OF THE INVENTION

The apparatuses and methods disclosed in this document are described in detail by way of examples and with reference to the figures. Unless otherwise specified, like numbers in the figures indicate references to the same, similar, or corresponding elements throughout the figures. It will be appreciated that modifications to disclosed and described examples, arrangements, configurations, components, elements, apparatuses, methods, materials, etc. can be made and may be desired for a specific application. In this disclosure, any identification of specific shapes, materials, techniques, arrangements, etc. are either related to a specific example presented or are merely a general description of such a shape, material, technique, arrangement, etc. Identifications of specific details or examples are not intended to be, and should not be, construed as mandatory or limiting unless specifically designated as such. Selected examples of apparatuses and methods are hereinafter disclosed and described in detail with reference made to FIGURES.

As used herein, the word "exemplary" means "serving as an example, instance or illustration." The embodiments described herein are not limiting, but rather are exemplary only. It should be understood that the described embodiment are not necessarily to be construed as preferred or advantageous over other embodiments. Moreover, the terms "embodiments of the invention", "embodiments" or "invention" do not require that all embodiments of the invention include the discussed feature, advantage or mode of operation.

Generally referring to FIGS. 1a through 3b, a RFID device including an antenna structure and at least one environmentally-sensitive or responsive material is disclosed. The at least one environmentally-sensitive material may be configured to be responsive to an ambient environmental condition such as a physical parameter or to the presence or absence of a chemical or biological material. The antenna structure may be locally modified or otherwise enhanced in order to achieve an optimized interaction between the environmentally-sensitive material, and the antenna structure. To that end, the RFID device may also include a secondary conductive element.

Turning to FIGS. 1a through 1c, an exemplary embodiment of an RFID device 100 is shown. The RFID device 100 can have a variety of components. The RFID device 100 may include a substrate 102, and an antenna structure 104 disposed thereon. Substrate 102 can be any material, for example paper, coated paper, polyethylene terephthalate (PET), laminations of film and paper or any other suitable substrate that can be desired. Antenna structure 104 can be any of a variety of materials, for example aluminum, copper, silver or another thin, conductive material, for example etched or hot-stamped metal foil. The foregoing RFID device 100 can be provided as part of a preformed RFID inlay. Exemplary RFID inlays for use in accordance with the present invention are available from Avery Dennison RFID Company of Clinton, S.C.

The antenna structure 104 may alternately be a conductive ink, consisting of one or more types of conductive particles suspended in a suitable matrix, an inorganic semiconductor material such as doped amorphous silicon, an organic conductor such as polyaniline, or a combination of multiple layers of any of the above conductors to give the desired electrical and mechanical characteristics.

Antenna structure 104 may be coupled to a wireless communications device, such as an RFID chip 108 that may be part of an RFID strap or interposer 106. Strap or interposer 106 may further include conductive leads 110, 112 to facilitate coupling between antenna structure 104 and RFID chip 108. In some embodiments, strap or interposer 106 may also include a substrate to facilitate supporting RFID chip 108 and conductive leads 110.

Antenna structure 104 may be a continuous, unitary layer of conductive material, and may have an elongated slot 114 defined therein. Elongated slot 114 may partition antenna structure 104 such that on either side of elongated slot 114 may be portions 116, 118. Each of portions 116, 118 may be coupled to each of the conductive leads 110, 112, respectively. The conductive leads 110, 112 may in turn be coupled to contact points or areas disposed on RFID chip 108. A strap or interposer 106 may further be disposed proximate to the open end of elongated slot 114 of the antenna structure such that it bridges the elongated slot 114 and facilitates coupling between portions 116, 118 via strap or interposer 106. A current passing through antenna structure 104 may pass from one contact point on RFID chip 108, through conductive lead 110, portion 116, portion 118, conductive lead 112, and to another contact point on the RFID chip 108. Furthermore, portions 116 and 118 may be capacitively or inductively coupled via elongated slot 114. Coupling between antenna structure 114 and strap or interposer 106 may be a direct, conductive coupling or may be an indirect, reactive coupling, such as, for example, capacitive or inductive coupling. The antenna structure 104 may therefore act as a hybrid slot-loop antenna, such as that described in U.S. Pat. No. 7,298,343, the contents of which are hereby incorporated by reference in their entirety.

The characteristics that may be exhibited by hybrid slot-loop antennas include, but are not limited to, increased readability characteristics in substantially any direction within or parallel to the plane of antenna structure 104 or RFID device 100 as a whole, as well as improved readability performance at short ranges in any direction, such as above or below the plane of antenna structure 104 or RFID device 100 as a whole. Furthermore, antenna structure 104 may be tuned as desired via any variation or combination of length, width, positioning and shape of elongated slot 114. An additional characteristic of hybrid slot-loop antennas is that the sensitivity of antenna structure 104 to the presence of a dielectric material varies along the length of elongated slot 106. Thus, by placing a dielectric material across a desired portion of elongated slot 106, the gain, near field performance and far field performance of antenna structure 104 may be optimized, and such optimization effects may vary in relation to the positioning of the dielectric material along the length of elongated slot 106.

Still referring to FIGS. 1a through 1c, RFID device 100 may further include an environmentally-responsive or sensitive material 120. In some embodiments, environmentally-responsive material may be a coating. Environmentally-responsive material 120 may have dielectric, magnetic or conductive properties that vary in response to environmental parameters, or to the presence or absence of a chemical or biological material. For example, environmentally-responsive material 120 may be a polymer-based material having polar or dipole characteristics. As an exemplary and non-limiting list, environmentally-responsive material 120 may have dielectric, magnetic or conductive properties that vary in response to temperature, humidity, pressure, or other environmental factors; environmentally-responsive material 120 may also have dielectric properties that vary in response to the concentration of particular compounds in the ambient environment.

Examples of some environmentally sensitive materials are described below. The sensing material may be selected to detect a particular environmental condition. For example, in order to detect a chemical or biological entity, a material whose complex dielectric constant and conductivity or other electrical parameter changes in response to exposure (e.g., absorption) of the chemical or biological entity may be selected. Similarly, to detect exposure to radiation a material whose electrical performance degrades in response to alpha, beta, gamma, X-ray or ultraviolet radiation may be used. As discussed, the sensing material may comprise one or more layers and in which only one layer, any combination of layers, or all layers have an electrical parameter that changes in response to the same or different environmental condition. In addition, the pattern of the sensing material may be of any suitable pattern to provide the desired coupling.

In one embodiment material 120 is a foam or elastic material that has conductive particles, such as carbon, embedded into its structure. It is known that physical deformation of such materials, by varying the separation and hence the probability of contact between adjacent particles, changes the conductivity of the material. For example, a material of thickness 4 mm may have a resistivity of 1000 ohms per square but, when compressed to 2 mm thickness, this may drop to 200 ohms per square.

Changing the physical dimensions of the foam, and hence altering the resistivity, can be achieved in a number of ways and the following represent a non-exhaustive listing of examples;

physical compression, for example in response to an object being placed on top of element 120 or forcing the element 120 on to itself;

bending, for example in response to a lid of a container being opened, or, when coupled to a material that has a defined deformation with temperature;

stretching, due to an object being hung on a tether or fastener formed partially of the material or exerting opposing forces on an object to cause the object to elongate and place stresses on the internal components;

compression or stretching caused by an external environmental parameter such as air pressure (for a foam filled with a gas when the pressure exceeds the internal pressure of the foam cells they will compress, when the pressure is below the internal pressure they will expand).

Another example of a chemically responsive material is the organic polymer, polyaniline. This materials conductivity is strongly related to its oxidation state, which, in turn, via an appropriate chemical environment, may be made to respond to factors such as the presence of a gas, liquid and parameters such as pH. A range of alternate organic conductors, such as polythiophene, polyacetylene, polypyrrole and PEDOT:PSS (Poly(3,4-ethylenedioxythiophene)poly(styrenesulfonate)) exist and have known changes in electrical and dielectric properties in response to a range of physical, chemical and biological states.

The environmental response of these materials may be include reversible parameters, where, for example, in the case of a conductive foam to which pressure is applied, the resistivity return to close to its original value when the pressure is removed or irreversible responses, such as, in the case of the conductive foam, the pressure has reached a point that the cells of the foam are ruptured and the resistivity will not return to its original state when pressure is removed. An additional form of response, important for sensing parameters such as temperature of exposure to chemical agents, is where the sensing material integrates exposure over a defined time. For example, in the case of temperature, the material parameter maybe the integral of the materials response over a period of days, and may emulate the response of, for example, the growth of bacteria in a product. Environmentally-responsive material 120 may be disposed across and/or within elongated slot 114, as shown in FIGS. 1a and 1c. Suitable methods of applying the responsive material 120 would include printing, laminating a film, vapor deposition, coating, spreading, spraying, sputtering, or, in the case of a discrete physical element by such methods as pick and place or pattern application with a suitable adhesive or by using strap attach technology. The presence of environmentally responsive or sensitive material 120 within elongated slot 114 may alter the level of interaction between portions 116, 118 across elongated slot 114, and, therefore, may alter the gain, far field performance and near field performance of RFID tag 100. Furthermore, it should be appreciated that the interaction between portions 116, 118 can vary along the length of slot 114. Therefore, as an illustrative example and as shown in FIG. 1b, the effect of environmentally responsive or sensitive material 120 disposed at point A along slot 114 may not be equivalent to the effect of material 120 disposed at point B along slot 114. Thus, the interactions between antenna structure 104 and environmentally responsive or sensitive material 120, and, consequently, the operating characteristics of RFID device 100 may be optimized by selectively choosing the position of material 120 along slot 114 or alternatively modified to react in a particular manner depending on the position of the material 120.

In operation, the dielectric, magnetic or conductive properties of environmentally responsive or sensitive material 120 may vary in response to a particular ambient environmental factor, as described above. Such a variation may in turn induce a variation in the interaction between portions 116, 118 at the location of material 120, and may likewise induce a variation in the interaction between environmentally responsive or sensitive material 120 and antenna structure 104. Thus, operating properties of antenna structure 104 such as gain, near field performance and far field performance may vary in real time in response to the particular environmental or sensing factor. In addition, changes in the antenna complex impedance will interact with the complex impedance of the RFID device 110 to later the near and far field performance and characteristics.

Turning to FIG. 2, another exemplary embodiment of RFID device 100 may include an interdigitated region 202. Interdigitated region 202 may include a plurality of fingers 204, 206 jutting out from portions 116, 118, respectively, into elongated slot 114. Fingers 204 of portion 116 may interdigitate with corresponding fingers 206 of portion 118, thereby defining a substantially serpentine gap 208 therebetween. Capacitive or inductive coupling may occur across gap 208, thereby indirectly coupling portions 116, 118. Environmentally responsive or sensitive material 120 may be disposed across interdigitated region 202, within gap 208, and within elongated slot 114 proximate to interdigitated region 202.

Turning to FIGS. 3a through 3b, in another exemplary embodiment the RFID device 100 may include an additional conductive layer 302. The conductive layer 302 can be any of a variety of materials, for example aluminum, copper, silver or another thin, conductive material, for example etched or hot-stamped metal foil. Conductive layer 302 may be disposed on top of environmentally responsive material 120, which may in turn be disposed at a desired location across and within elongated slot 114. Conductive layer 302 may therefore be capacitively coupled to portions 116, 118 of antenna structure 104. Consequently, two capacitive couplings, in an effective serial arrangement, may effectively be created at the desired location across environmentally responsive material 120.

During the manufacture of RFID tag 100, in some embodiments, environmentally-responsive layer 120 may be applied to antenna structure via methods such as printing, vacuum deposition, or other methods known in the art. In such embodiments, the environmentally responsive layer 120 may be applied at a desired position or location across and within elongated slot 114. A conductive layer 302 having similar or substantially similar dimensions to the environmentally responsive layer 120 may then be applied to the exposed surface of layer 120 with its position or location registered to layer 120. In other embodiments, the environmentally responsive or sensitive layer 120 may be applied as a coating covering the antenna structure 104 substantially in its entirety. In such embodiments, an additional conductive layer 302 (or layers) may be applied to the exposed surface of environmentally responsive or sensitive layer 120 (or layers when provided) only at the desired position or location across the elongated slot 114. The desired variation in the operating characteristics of antenna portion 104 may thus be achieved by positioning additional conductive layer 302 or layers at a corresponding desired location or position.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. An RFID device, comprising: a substrate; an antenna structure having a first sheet of electrically conductive material including two parts and an elongated slot extending therebetween, the elongated slot having a length and one open end; a wireless communications device coupled to the substrate; and a non-ambient environmentally responsive material deposited within or across a portion of the elongated slot wherein the material alters the level of interaction between the two parts of the antenna structure in response to a change in an environmental factor and wherein the interaction between the two parts of the antenna varies along a length of the slot.

2. The RFID device of claim 1, wherein the antenna structure is a slot-loop antenna.

3. The RFID device of claim 1, wherein the two parts include a plurality of interdigitated fingers along a portion of the elongated slot.

4. The RFID device of claim 3, wherein the environmentally responsive material is disposed proximate to the interdigitated fingers.

5. The RFID device of claim 1, further comprising a second sheet of electrically conductive material disposed on an exposed side of the environmentally-responsive material.

6. The RFID device of claim 1, wherein the environmentally-responsive material is disposed over the antenna structure as a coating.

7. The RFID device of claim 1, wherein
the sheet of electrically conductive material having a first part and a second part, the first and second parts being coupled together reactively, conductively or a combination of both reactive and conductive coupling, such that an operating parameter of the antenna structure varies in relation to an environmental condition to alter the gain, far field performance and near field performance of the RFID device.

8. The RFID device of claim 7, wherein the coupling is facilitated by a dielectric material.

9. The RFID device of claim 8, wherein the dielectric material is responsive to the environmental condition.

10. The RFID device of claim 8, wherein the dielectric material is disposed between the first part and the second part.

11. An RFID device, comprising: a substrate; an antenna structure having a sheet of electrically conductive material having a first part and a second part, the two parts being capacitively coupled together such that an operating parameter of the antenna structure varies in relation to an environmental condition wherein an elongated slot having a length that extends between the two parts and a non-ambient environmentally responsive material is desposited within a portion of the length of the elongated slot and the non-ambient environmentally responsive material alters the level of interaction between the two parts of the antenna structure in response to an environmental and wherein the interaction between the two parts of the antenna varies along a length of the slot; and a wireless communications device coupled to the antenna structure.

12. A method of forming an RFID device, comprising:
depositing a first electrically conductive material on a substrate; defining an elongated slot in the first electrically conductive material such that the conductive material includes two parts the elongated slot having a length and an end; depositing a non-ambient environmentally responsive material at a location along the elongated slot wherein the material alters the level of interaction between the two parts in response to an environmental factor selected from the group including temperature, physical compression, bending, stretching air pressure, biological or chemical and wherein the interaction between the two parts of the antenna varies along a length of the slot; and coupling a wireless communications device to the antenna structure.

13. The method of claim 12, further comprising:
defining an interdigitated region at a location along the elongated slot; and
depositing an environmentally responsive material at the interdigitated region.

14. The method of claim 12, further comprising depositing a second electrically conductive material on an exposed side of the environmentally-responsive material.

15. The method of claim 12, further comprising coating the first electrically conductive material with an environmentally responsive material.

16. The method of claim 12, wherein the-sheet of electrically conductive material has a first part and a second part; and the two parts are
capacitively coupled.

17. The method of claim 12, wherein the environmentally-responsive material is a dielectric.

18. The method of claim 12, wherein the antenna structure is a slot-loop antenna.

19. The method of claim 12, wherein the environmentally-responsive material is disposed within the elongated slot.

* * * * *